No. 771,190. PATENTED SEPT. 27, 1904.
L. VANDERPERRE-SIMON.
PNEUMATIC TIRE GUARD.
APPLICATION FILED JULY 17, 1903.
NO MODEL.
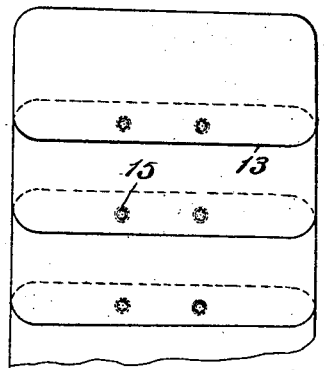
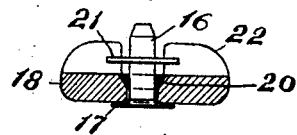
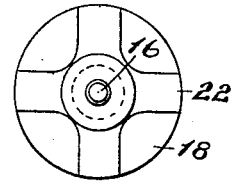
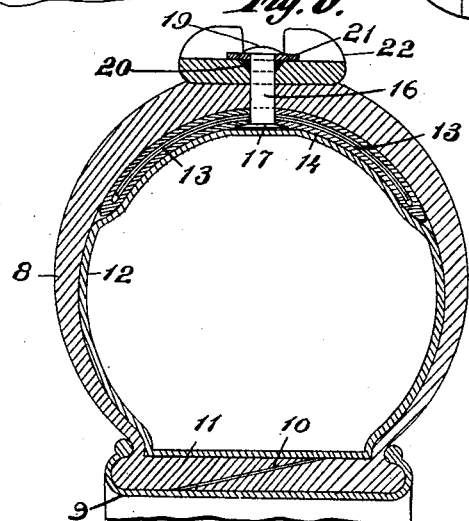
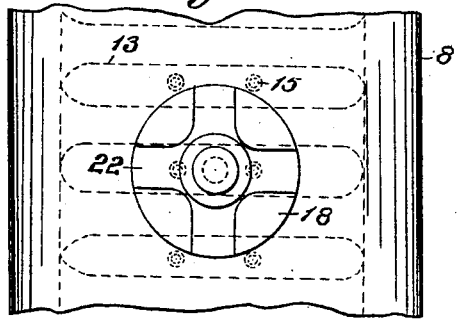
Witnesses:
Thomas Madden
L. Max Rosenberg
Inventor:
Laurent Vanderperre-Simon
By his Attys No. 771,190.

Patented September 27, 1904.

UNITED STATES PATENT OFFICE.

LAURENT VANDERPERRE-SIMON, OF BRUSSELS, BELGIUM.

PNEUMATIC-TIRE GUARD.

SPECIFICATION forming part of Letters Patent No. 771,190, dated September 27, 1904.

Application filed July 17, 1903. Serial No. 165,988. (No model.)

*To all whom it may concern:*

Be it known that I, LAURENT VANDERPERRE-SIMON, a subject of the King of the Belgians, and a resident of Brussels, Belgium, have invented certain new and useful Improvements in Imperforable Guards to Adjust to Pneumatic Tires on Automobiles or other Vehicles, of which the following is a specification.

My invention pertains to pneumatic tires; and the object is to provide a guard for the same, so that the tube cannot be perforated or ruptured.

It consists of an ordinary rubber or flexible tire having an interior rubber tube, the tread of the outer rubber tube being thickened or reinforced in the usual way, and between the two tubes along the tread portion I place a series of metal plates or blades, which are inclosed or held together by a tissue of fiber, composed of horsehair or other material, which are secured in position by means of rivets or bolts having projecting heads, made, preferably, cross-shaped, which are designed to travel on the ground, and thus relieve the surface of the tire from wear as well as to prevent slipping of the same, as will now be set forth in detail.

In the drawings, Figure 1 is an edge view of the metallic plate used in the tire. Fig. 2 is a top or plan view of a series of such plates; Fig. 3, a cross-section of the metallic plates, secured in a tissue of fiber; Fig. 4, a cross-section of one of the securing bolts or rivets; Fig. 5, a top view of the head or bearing end of the rivet or bolt; Fig. 6, a cross-section of a tire, showing manner of applying the improvement thereto; and Fig. 7, a view of portion of a tire.

In constructing my invention I provide a tire 8, made in the ordinary way and secured to a rim 9, the base portion 11 being slitted, as shown at 10, by means of which it may be attached to the rim. An inner tire 12 is also employed, with suitable means for inflating same. (Not shown.)

The principal features of my invention consist of a series of transversely-disposed blades 13, made of wood, bone, horn, whalebone, or other suitable material, which are incased between webs 14, of horsehair, fiber, or metal, and held together in proper relation with each other by means of rivets 15, the tissue thus formed being placed between the inner air-tube and the outer tire, bent to conform with the shape of the tire and tube. This tissue is secured to the tire by means of bolts 16 at suitable intervals. Each bolt has a head 17, which rests against the inner surface of the tire and projects out a suitable distance to receive a peculiarly-formed bearing-plate 18, through which the bolt passes, and is secured by means of a nut 19, or the nut may be riveted. The opening in the bearing-plate is countersunk and adapted to receive a soft-metal washer 20, which fits in the countersunk socket, whereby a tight joint may be made, and to further give security I use a washer 21 to receive the nut 19 or the riveted end of the bolt. The outer surface of the bearing-plate may be provided with cross-ribs 22 or have other suitable raised surfaces which strike the surface of the ground and serve to prevent slipping of the tire.

What I claim as new is—

1. A pneumatic tire having an air-tube and a protecting tissue between said tire and tube, with projecting bearing-plates secured to the outer tube and to said protecting tissue.

2. In a pneumatic tire, the combination of a tire, an air-tube, a protecting tissue between them and a bearing-plate at intervals on the outer surface of the tire secured to the tire and tissue by bolts, as set forth.

3. In a pneumatic tire, the combination of a tire and an air-tube, having between them a tissue composed of transverse plates or strips of wood, bone or other material incased in fibrous metallic webs, and bearing-plates in the outer surface of said tire secured to said tissue and web by bolts, substantially as set forth.

Signed at Brussels, Belgium, this 8th day of April, A. D. 1903.

LAURENT VANDERPERRE-SIMON.

Witnesses:
 ADONIS DU CUIRSAR,
 GREGORY PHELAN.